A. C. BRIGGS.
Horse Hay Fork.
No. 56,170.
Patented July 10, 1866.
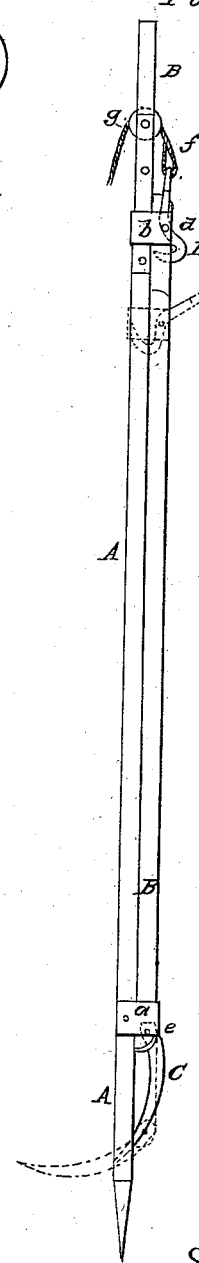

UNITED STATES PATENT OFFICE.

A. C. BRIGGS, OF NORTH EASTON, NEW YORK.

IMPROVEMENT IN HORSE HAY-FORKS.

Specification forming part of Letters Patent No. 56,170, dated July 10, 1866.

*To all whom it may concern:*

Be it known that I, A. C. BRIGGS, of North Easton, in the county of Washington and State of New York, have invented an Improved Hay-Fork, of which the following is a specification.

The object of my invention is to furnish a simple and effective means for handling hay by horse or other power; and it consists of two parallel sliding bars or rods, one of which is pointed at one end and furnished with a ring or other device for fastening it to the rope or chain by which the fork is operated. The other bar is furnished with a fork or tine, constructed and operating in a new and improved manner, at its lower end, and its upper end is furnished with a catch for holding the bar and fork in position. A device for tripping the said fork or tine is also provided, as hereinafter described.

In the accompanying drawings, Figure 1 is a back elevation of my improved fork. Fig. 2 is a side elevation of the same.

A is a rod or slender bar of hard tough wood or other suitable material, pointed at the lower end and furnished with a metallic ring, B, at the upper end. Said metallic ring is securely fastened to the bar, and the rope for raising the fork is fastened to it.

Instead of the metallic ring, the wood of the bar may be continued out and bent over, so as to form a loop, or enlarged and a hole made through it for the rope.

Near the lower end of the bar A an angular or slanting hole, $h$, is made through it for the fork or tine C to pass through.

The tine C is jointed at $e$ to the bar D, the point resting in the slot or hole in the bar A. The bar D is joined to the bar A, on which it slides, by the loops or bands $a$ and $b$, $a$ being riveted to the bar A and $b$ to the bar D.

A shoulder on the tine C strikes against the strap $a$ when the bar D is raised, and prevents the tine from falling entirely out of the slot or hole $h$ in the bar A.

Near the upper end of the bar D there is a catch, E, which is hung on the rivet $d$, and which catches in a hole in the bar A when the bar D is at its lowest point, and thus holds the said bar D down.

When the bar D is down the tine C and catch E are in the position shown in red lines, which is the position they occupy when ready to raise the hay, the tine C being about at right angles to the point of the bar A, and the catch E being shut into the hole in the bar A, thus locking the bar D down and preventing the tine C from falling so as to release the hay.

A small rope, $f$, is fastened to the loop in the catch E, whence it passes over the friction-wheel $g$ in the bar A, and thence down to the hands of the operator.

When it is desired to release the hay which the fork carries the operator pulls the rope $f$, and the catch E, the bar D, and the tine C, which were before in the position shown in red lines, are drawn up, as shown in black lines, and the hay falls from the fork.

In using my hay-fork the parts are first adjusted as seen in Fig. 1 and the pointed end of the fork thrust well into the hay to be raised. The bar D is then pushed down by bearing down on the catch E until the end of the said catch enters the hole in the bar A, when the fork is ready to be raised. When the hay has been carried to the place designed for its reception the rope $f$ is pulled, which trips the catch E and draws the tine C up and out from under the hay, so that it may drop off.

It will be observed that the point of the bar A extends down a sufficient distance below the tine C to form a bearing, which will prevent the hay from slipping off from the fork; and this is very important, as without it it would be necessary to provide two tines or other device to prevent the one tine from backing out and letting the hay fall so soon as the power is applied to raise it.

Having thus fully described my invention and the manner of operating it, I claim—

1. The combination of the tine C with the bars A and D and catch E, arranged and operating substantially as herein set forth.

2. Constructing the tine C with a shoulder, as described, when used in combination with the bar D and slide $a$, substantially as and for the purpose specified.

A. C. BRIGGS.

Witnesses:
JAMES B. ALLEN,
EDWARD MORGAN.